US011954380B2

(12) United States Patent
Taylor et al.

(10) Patent No.: US 11,954,380 B2
(45) Date of Patent: Apr. 9, 2024

(54) SYSTEM FOR PROVIDING NEW SUBSCRIPTION INITIATION RELATED TO AN EXISTING SUBSCRIPTION OF USER ASSOCIATED WITH DEVICE IN A SUBSCRIPTION PERIOD COINCIDING WITH THE EXISTING SUBSCRIPTION

(71) Applicant: Hewlett-Packard Development Company, L.P., Spring, TX (US)

(72) Inventors: David Taylor, Vancouver, WA (US); Noah Michael Collins, Vancouver, WA (US); Shiyun Yie, Vancouver, WA (US); Riley Dasch, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/013,039

(22) PCT Filed: Jul. 16, 2020

(86) PCT No.: PCT/US2020/042341
§ 371 (c)(1),
(2) Date: Dec. 27, 2022

(87) PCT Pub. No.: WO2022/015312
PCT Pub. Date: Jan. 20, 2022

(65) Prior Publication Data
US 2023/0244424 A1 Aug. 3, 2023

(51) Int. Cl.
*G06F 3/12* (2006.01)

(52) U.S. Cl.
CPC ......... *G06F 3/1219* (2013.01); *G06F 3/1203* (2013.01); *G06F 3/1239* (2013.01); *G06F 3/1218* (2013.01)

(58) Field of Classification Search
USPC ....................... 358/1.9, 1.15, 1, 15
See application file for complete search history.

(56) References Cited

U.S. PATENT DOCUMENTS

| | | | |
|---|---|---|---|
| 7,610,245 B2 | 10/2009 | Dent et al. | |
| 9,195,416 B2 | 11/2015 | Bhatia | |
| 9,633,382 B2 | 4/2017 | Kim | |
| 10,592,892 B2 * | 3/2020 | Bhatia | G06F 3/1219 |
| 2003/0010818 A1 | 1/2003 | Asawaka | |
| 2013/0054402 A1 | 2/2013 | Asherman et al. | |
| 2014/0313541 A1 * | 10/2014 | Venkata Prasad | G06F 3/126 358/1.15 |
| 2020/0049839 A1 * | 2/2020 | Zhang | G01T 1/244 |
| 2021/0368063 A1 * | 11/2021 | Wong | G06F 3/1204 |
| 2023/0333787 A1 * | 10/2023 | Bhaskaran | G06F 21/10 |

FOREIGN PATENT DOCUMENTS

| | | | |
|---|---|---|---|
| WO | 2013/062508 A1 | 5/2013 | |
| WO | 2014/120187 A1 | 8/2014 | |
| WO | 2019/005497 A1 | 1/2019 | |

* cited by examiner

*Primary Examiner* — Haris Sabah
(74) *Attorney, Agent, or Firm* — Michael Dryja

(57) ABSTRACT

Examples disclosed herein relate to receiving a request to initiate a new subscription for an entity, determining whether the entity is associated with an existing subscription, and in response to determining that the entity is associated with the existing subscription, initiating the new subscription with a subscription period coinciding with the existing subscription.

15 Claims, 3 Drawing Sheets

SYSTEM FOR PROVIDING NEW SUBSCRIPTION INITIATION RELATED TO AN EXISTING SUBSCRIPTION OF USER ASSOCIATED WITH DEVICE IN A SUBSCRIPTION PERIOD COINCIDING WITH THE EXISTING SUBSCRIPTION

BACKGROUND

Multi-function devices often combine different components such as a printer, scanner, and copier into a single device. Such devices frequently utilize refills of consumables, such as print substances (e.g., ink, toner, and/or additive materials) and/or media (e.g., paper, vinyl, and/or other print substrates).

Such devices can use a variety of different technologies to form images on media such as paper or to build three-dimensional (3D) objects. Such technologies include dry electrophotography (EP) and liquid EP (LEP) technologies, which may be considered as different types of laser and light-emitting diode (LED) printing technologies, as well as inkjet-printing technologies and three-dimensional (3D) printing technologies. Printing devices deposit print material, such as colorant like toner, ink (which can include other printing fluids or material as well), or 3D print material.

Figure 1:
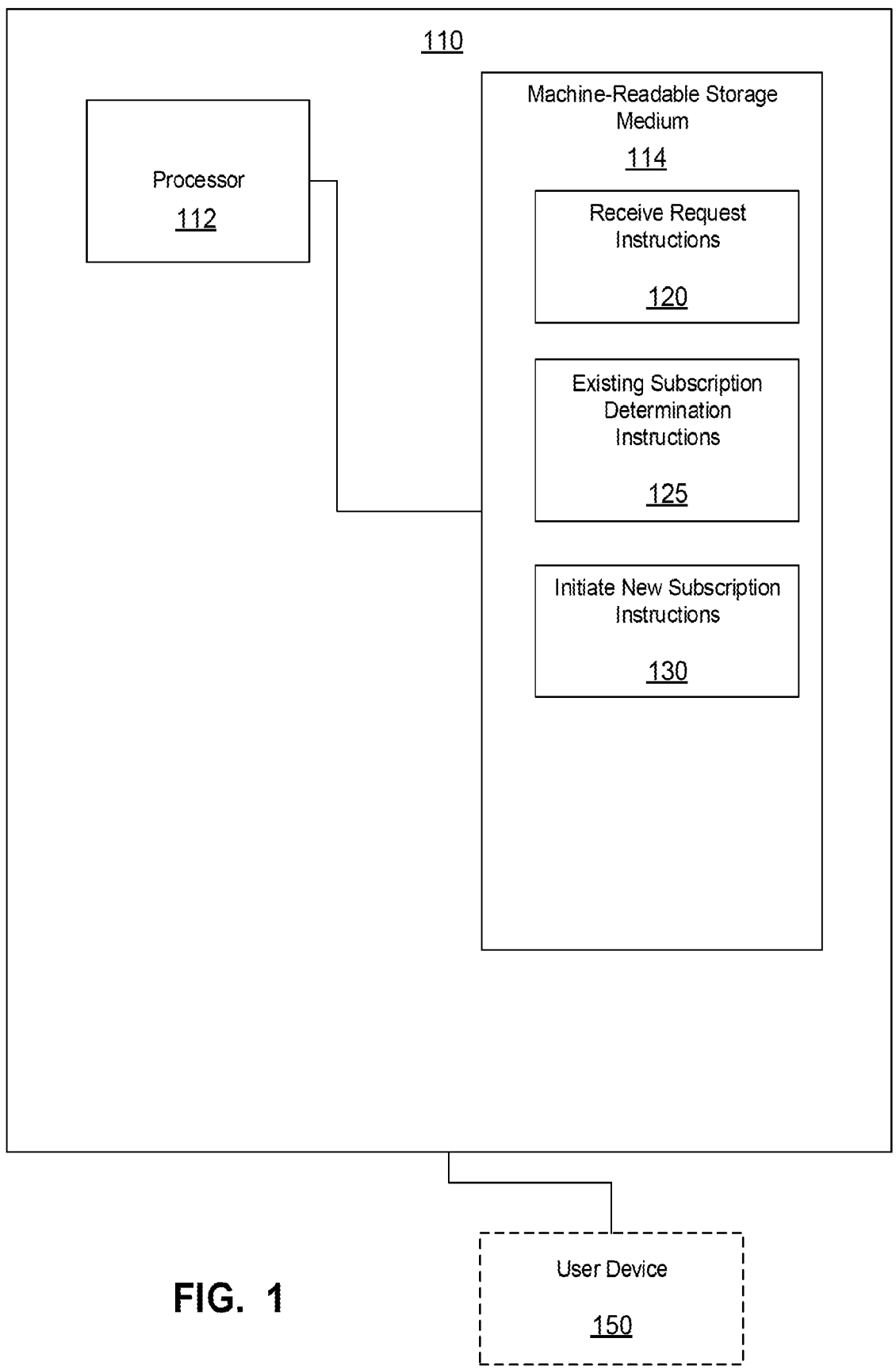
FIG. 1 is a block diagram of an example computing device for providing subscription initiation.

Throughout the drawings, identical reference numbers designate similar, but not necessarily identical, elements. The figures are not necessarily to scale, and the size of some parts may be exaggerated to more clearly illustrate the example shown. Moreover the drawings provide examples and/or implementations consistent with the description; however, the description is not limited to the examples and/or implementations provided in the drawings.

DETAILED DESCRIPTION

Most multi-function-print devices (MFPs) provide several features, such as an option to scan a physical document, which may be controlled via an on-device control panel, a connected application, and/or a remote service. Other options may include printing, copying, faxing, document assembly, etc. The scanning portion of an MFP may comprise an optical assembly located within a sealed enclosure. The sealed enclosure may have a scan window through which the optical assembly can scan a document, which may be placed on a flatbed and/or delivered by a sheet feeder mechanism.

For a printing function, devices may deposit print material to form images on media or, in the case of three-dimensional (3D) printing devices, to additively build (3D) objects. A printing device may thus include a cartridge having a supply of print material, like toner, ink, other colorant, 3D print material, and so on. When the print material supply is depleted, the cartridge can be replaced with a replacement cartridge having a fresh supply of print material. A printing device may provide a notification when the remaining print material supply of the currently installed cartridge is running low and/or has become depleted.

In some situations, consumables may be provided to an entity associated with a device, such as a printing device and/or MFP on a subscription basis. Such subscriptions may, for example, result in consumables being shipped on a periodic basis and/or an as-needed basis, such as when a supply of the consumable is determined to be running low. Some entities, which may comprise an individual user and/or an organization, such as a business, office, company, etc., may be responsible for the operation of multiple devices that may utilize a multitude of consumables. For example, laser-based printing devices may utilize toner cartridge consumables of various colors while ink-based printing devices may utilize ink cartridges of various colors; both ink and laser based devices may utilize paper and/or other media consumables. Similarly, 3-D printing based devices may utilize additive material and/or fusing consumables, for example. Maintaining subscriptions for each of these consumables individually may sometimes result in multiple bills of various amounts received for a given period. This may result in frustration and/or confusion for the entity and may sometimes result in bills being missed and subscriptions cancelled and/or penalties imposed.

Techniques described herein ameliorate these and other issues. If an entity is billed multiple times in a period, such as a month, for a number of related services, they might find this a bit frustrating. By synchronizing billing dates for all subscriptions associated with an entity, they may be less likely to call customer service with confusion over multiple charges during the period. Additionally, techniques described herein enable savings on overall transaction costs by incurring a single transaction fee and reducing overhead for recordkeeping and billing. Further, this improves the entity's experience by matching billed amounts to specific devices and their related subscription(s).

FIG. 1 is a block diagram of an example computing device 110 for providing subscription initiation. Computing device 110 may comprise a processor 112 and a non-transitory, machine-readable storage medium 114. Storage medium 114 may comprise a plurality of processor-executable instructions, such as instructions 120 and instructions 125. In some implementations, instructions 120, 125 may be associated with a single computing device 110 and/or may be communicatively coupled among different computing devices such as via a direct connection, bus, or network.

Processor 112 may comprise a central processing unit (CPU), a semiconductor-based microprocessor, a programmable component such as a complex programmable logic device (CPLD) and/or field-programmable gate array (FPGA), or any other hardware device suitable for retrieval and execution of instructions stored in machine-readable storage medium 114. In particular, processor 112 may fetch, decode, and execute receive request instructions 120, existing subscription determination instructions 125, and initiate new subscription instructions 130.

Executable instructions 120, 125, 130 may comprise logic stored in any portion and/or component of machine-readable storage medium 114 and executable by processor 112. The machine-readable storage medium 114 may comprise both volatile and/or nonvolatile memory and data storage components. Volatile components are those that do not retain data values upon loss of power. Nonvolatile components are those that retain data upon a loss of power.

The machine-readable storage medium 114 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, and/or a combination of any two and/or more of these memory components. In addition, the RAM may comprise, for example, static random access memory (SRAM), dynamic random access memory (DRAM), and/or magnetic random access memory (MRAM) and other such devices. The ROM may comprise, for example, a programmable read-only memory (PROM), an erasable programmable read-only memory (EPROM), an electrically erasable programmable read-only memory (EEPROM), and/or other like memory device.

Receive request instructions 120 may receive a request to initiate a new subscription for an entity. For example, as part of a setup process for a user device 150 (e.g. a printer and/or multi-function device), an entity, such as a user, may be asked whether they wish to enroll in a consumable subscription program. The user may provide some information, such as shipping address and billing information (e.g., a credit card number) and/or some details may be retrieved from an account and/or profile associated with the entity. A service, application, and/or process, etc., executing on device 110 may receive a communication from user device 150 to request the subscription be initiated. The subscription request may comprise various details such as desired billing period (e.g., monthly, quarterly, annually) and/or types and amounts of consumables.

Existing subscription determination instructions 125 may determine whether the entity is associated with an existing subscription. Upon receiving the request, device 110 may determine whether details about the entity received as part of the request correlate to any existing subscriptions for the entity. For example, the request may be associated with a user account previously associated with a second user device that also receives consumables through a subscription program. For another example, billing information received as part of the request may correlate to billing information for another subscription (e.g., the same credit card and/or address may be used for both).

In some implementations, the new subscription may be associated with a first user associated with the entity and the existing subscription may be associated with a second user associated with the entity. For example, a subscription for user device 150 may be initiated by a first employee of a company, but the subscription details, such as shipping address, correlate with an existing subscription set up by a second employee of the same company.

In some implementations, the new subscription may be associated with a first device associated with the entity and the existing subscription may be associated with a second device associated with the entity. For example, a user may request a new subscription for user device 150 with details that correspond to an existing subscription for a second user device. In some implementations, the new subscription and the existing subscription may both be associated with user device 150, but may be for different consumables, such as one subscription for ink and another for media.

Initiate new subscription instructions 130 may, in response to determining that the entity is associated with the existing subscription, initiate the new subscription with a subscription period coinciding with the existing subscription. For example, a subscription entry may be created in a fulfillment database that tracks which consumable(s), amounts of consumable(s), billing information, billing dates, and subscription periods, among other data. The subscription period may be entered so that it corresponds to an existing subscription entry and as such may share a billing date and/or billing period with the existing subscription.

In some implementations, the subscription period for the new subscription may comprise a shortened first subscription period. For example, a new subscription request may comprise a request for a monthly billing period that is received halfway through a monthly billing period for the existing subscription. The first billing period may thus be shortened so that the end of that first billing period coincides with the end of the existing subscription's current billing period.

Instructions 130 may further comprise instructions to calculate a pro-rated charge for the shortened first subscription period. For example, instructions 130 may combine a non pro-rated charge for a next non-shortened subscription period associated with the existing subscription with the pro-rated charge for the shortened first subscription period associated with the new subscription.

As an example, the new subscription may be received on the June $20^{th}$ and may comprise a regular, non-shortened subscription period of one month. The existing subscription may also comprise a regular subscription period of one month and may be configured to be billed on the last day of the month. Instructions 130 may combine the new subscription and the existing subscription by implementing the new subscription with a shortened first subscription period of 10 days—the difference between the date the subscription begins and the end date of the existing subscription's billing period. The bill for the first month may then be pro-rated to ⅓ of a full month's subscription for the period of 10 out of the 30 days in the month of June. Both the new and existing subscriptions may then be billed on the last day of the month by combining the pro-rated amount of the new subscription and the regular amount of the existing subscription.

In some implementations, instructions 130 may further comprise instructions to deliver a first subscription object associated with the new subscription with a second subscription object associated with the existing subscription. For example, the first subscription object may comprise a supply material (e.g., a black ink cartridge) for a first printing device and the second subscription object may comprise the same supply material (e.g., a second black ink cartridge) for a second printing device. For another example, the first subscription object may comprise a first supply material (e.g., a black ink cartridge) for a printing device and the second subscription object may comprise a second supply material (e.g., a pack of media) for the printing device.

Figure 2:
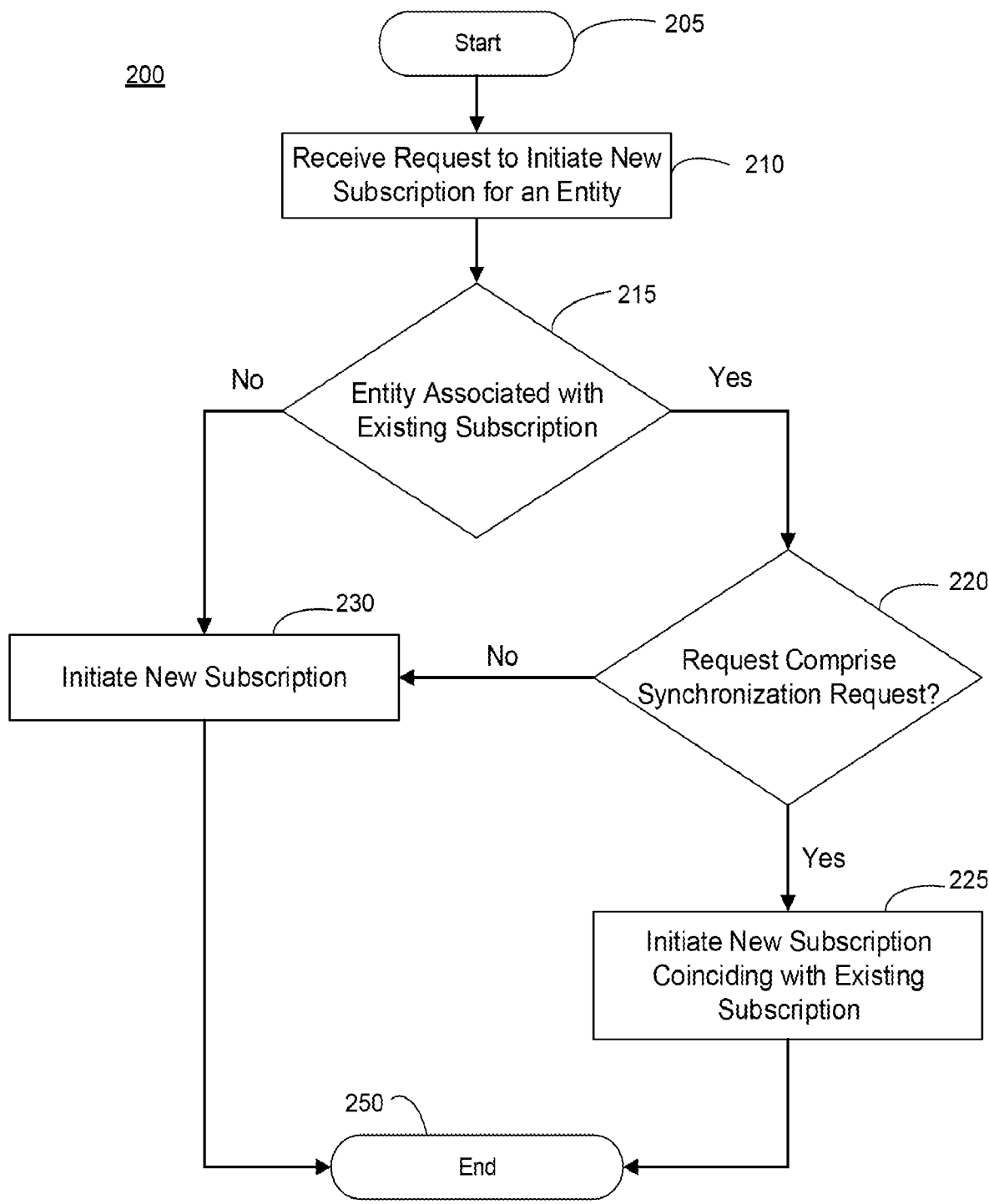
FIG. 2 is a flowchart of an example method for providing subscription initiation.

FIG. 2 is a flowchart of an example method 200 for subscription initiation. Although execution of method 200 is described below with reference to computing device 110, other suitable components for execution of method 200 may be used.

Method 200 may begin at stage 205 and advance to stage 210 where device 110 may receive a request to initiate a new subscription for an entity. For example, device 110 may execute receive request instructions 120 to receive a request to initiate a new subscription for an entity. For example, as part of a setup process for a user device 150 (e.g. a printer and/or multi-function device), an entity, such as a user, may be asked whether they wish to enroll in a consumable subscription program. The user may provide some information, such as shipping address and billing information (e.g., a credit card number) and/or some details may be retrieved from an account and/or profile associated with the entity. A service, application, and/or process, etc., executing on device 110 may receive a communication from user device 150 to request the subscription be initiated. The subscription request may comprise various details such as desired billing period (e.g., monthly, quarterly, annually) and/or types and amounts of consumables.

Method 200 may then advance to stage 215 where computing device 110 may determine whether the entity is associated with an existing subscription. For example, device 110 may execute existing subscription determination instructions 125 to determine whether the entity is associated with an existing subscription. Upon receiving the request, device 110 may determine whether details about the entity received as part of the request correlate to any existing subscriptions for the entity. For example, the request may be associated with a user account previously associated with a second user device that also receives consumables through a subscription program. For another example, billing information received as part of the request may correlate to billing information for another subscription (e.g., the same credit card and/or address may be used for both).

In some implementations, the new subscription may be associated with a first user associated with the entity and the existing subscription may be associated with a second user associated with the entity. For example, a subscription for user device 150 may be initiated by a first employee of a company, but the subscription details, such as shipping address, correlate with an existing subscription set up by a second employee of the same company.

In some implementations, the new subscription may be associated with a first device associated with the entity and the existing subscription may be associated with a second device associated with the entity. For example, a user may request a new subscription for user device 150 with details that correspond to an existing subscription for a second user device. In some implementations, the new subscription and the existing subscription may both be associated with user device 150, but may be for different consumables, such as one subscription for ink and another for media.

In some implementations, determining whether the entity is associated with the existing subscription may comprise determining whether a billing method associated with the new subscription matches an existing billing method associated with the existing subscription.

In response to determining that the entity is associated with the existing subscription, method 200 may advance to stage 220 where computing device 110 may determine whether the request to initiate the new subscription comprises a synchronization request. For example, when setting up new user device 150, a subscription initiation process may request various information from the entity, such as preferred billing period, amounts and/or type(s) of consumable(s), shipping and/or billing details, etc. The process may also present an option for the user to choose whether to synchronize with any existing subscriptions and/or may offer options on which subscriptions to synchronize. For example, the request may comprise a synchronization request only for subscriptions being shipped to a common address, even if a billing method is the same for other subscriptions being shipped to a different address.

In response to determining that the request to initiate the new subscription comprises the synchronization request, method 200 may advance to stage 225 where computing device 110 may initiate the new subscription with a subscription period coinciding with the existing subscription. For example, device 110 may execute initiate new subscription instructions 130 to, in response to determining that the entity is associated with the existing subscription, initiate the new subscription with a subscription period coinciding with the existing subscription. For example, a subscription entry may be created in a fulfillment database that tracks which consumable(s), amounts of consumable(s), billing information, billing dates, and subscription periods, among other data. The subscription period may be entered so that it corresponds to an existing subscription entry and as such may share a billing date and/or billing period with the existing subscription.

In some implementations, the subscription period for the new subscription may comprise a shortened first subscription period. For example, a new subscription request may comprise a request for a monthly billing period that is received halfway through a monthly billing period for the existing subscription. The first billing period may thus be shortened so that the end of that first billing period coincides with the end of the existing subscription's current billing period.

Instructions 130 may further comprise instructions to calculate a pro-rated charge for the shortened first subscription period. For example, instructions 130 may combine a non pro-rated charge for a next non-shortened subscription period associated with the existing subscription with the pro-rated charge for the shortened first subscription period associated with the new subscription.

In some implementations, initiating the new subscription with the subscription period coinciding with the existing subscription may comprise calculating a pro-rated charge for a shortened first subscription period associated with the new subscription.

In some implementations, initiating the new subscription with the subscription period coinciding with the existing subscription may comprise delivering a first subscription object associated with the new subscription with a second subscription object associated with the existing subscription.

In response to determining that no entity is associated with the existing subscription and/or that the request to initiate the new subscription does not comprise a synchronization request, method 200 may advance to stage 230 where computing device 110 may initiate the new subscription for the entity. For example, device 110 may execute initiate new subscription instructions 130 to create the subscription entry in a fulfillment database that tracks which consumable(s), amounts of consumable(s), billing information, billing dates, and subscription periods, among other data. When not synchronizing the new subscription to an existing subscription, the values for billing periods and/or dates may be set to defaults and/or according to parameters received in the subscription request, for example.

Method 200 may then end at stage 250.

Figure 3:
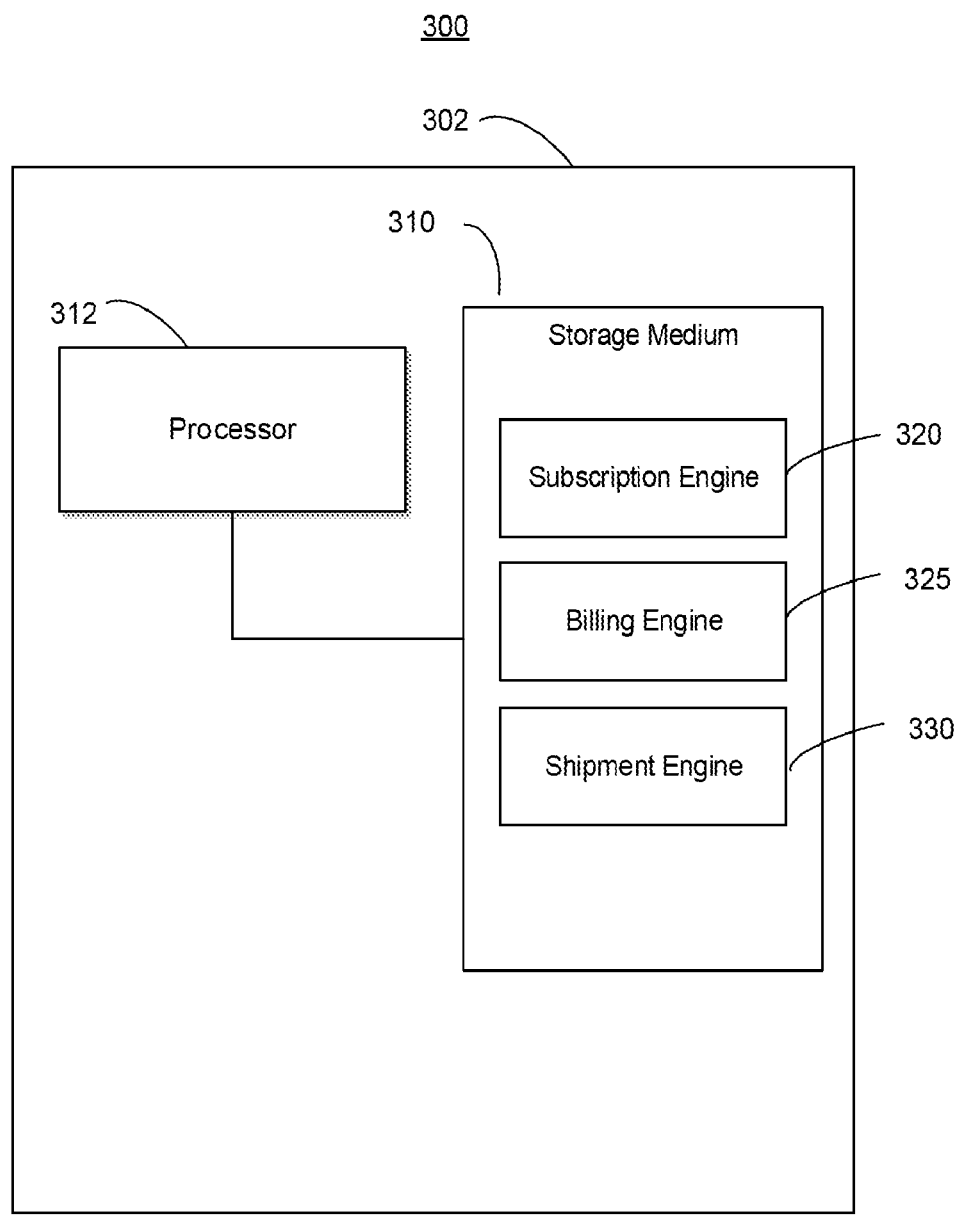
FIG. 3 is a block diagram of an example system for providing subscription initiation.

FIG. 3 is a block diagram of an example apparatus 300 for providing subscription initiation. Apparatus 300 may comprise a multi-function printer device 302 comprising a storage medium 310, and a processor 312. Device 302 may comprise and/or be associated with, for example, a general and/or special purpose computer, server, mainframe, desktop, laptop, tablet, smart phone, game console, printer, multi-function device, and/or any other system capable of providing computing capability consistent with providing the implementations described herein. Device 302 may store, in storage medium 310, a subscription engine 320, a billing engine 325, and a shipment engine 330.

Each of engines 320, 325, 330 may comprise any combination of hardware and programming to implement the functionalities of the respective engine. In examples described herein, such combinations of hardware and programming may be implemented in a number of different ways. For example, the programming for the engines may be processor executable instructions stored on a non-transitory machine-readable storage medium and the hardware for the engines may include a processing resource to execute those instructions. In such examples, the machine-readable storage medium may store instructions that, when executed by the processing resource, implement engines 320, 325, 330, In such examples, device 302 may comprise the machine-readable storage medium storing the instructions and the processing resource to execute the instructions, or the machine-readable storage medium may be separate but accessible to apparatus 300 and the processing resource.

Subscription engine 320 may receive a request to initiate a new subscription for an entity. For example, the entity may comprise a business, an organization, a location, a user, and/or a device, among other possibilities. In some implementations, subscription engine 320 may execute receive request instructions 120 to receive a request to initiate a new subscription for an entity. For example, as part of a setup process for a user device 150 (e.g. a printer and/or multifunction device), an entity, such as a user, may be asked whether they wish to enroll in a consumable subscription program. The user may provide some information, such as shipping address and billing information (e.g., a credit card number) and/or some details may be retrieved from an account and/or profile associated with the entity. A service, application, and/or process, etc., executing on device 110 may receive a communication from user device 150 to request the subscription be initiated. The subscription request may comprise various details such as desired billing period (e.g., monthly, quarterly, annually) and/or types and amounts of consumables.

Subscription engine 320 may further determine whether the entity is associated with an existing subscription. In response to determining that the entity is associated with the existing subscription, subscription engine 320 may initiate the new subscription with a subscription period coinciding with the existing subscription. For example, subscription engine 320 may execute existing subscription determination instructions 125 to determine whether the entity is associated with an existing subscription. Upon receiving the request, device 110 may determine whether details about the entity received as part of the request correlate to any existing subscriptions for the entity. For example, the request may be associated with a user account previously associated with a second user device that also receives consumables through a subscription program. For another example, billing information received as part of the request may correlate to billing information for another subscription (e.g., the same credit card and/or address may be used for both).

In some implementations, the new subscription may be associated with a first user associated with the entity and the existing subscription may be associated with a second user associated with the entity. For example, a subscription for user device 150 may be initiated by a first employee of a company, but the subscription details, such as shipping address, correlate with an existing subscription set up by a second employee of the same company.

In some implementations, the new subscription may be associated with a first device associated with the entity and the existing subscription may be associated with a second device associated with the entity. For example, a user may request a new subscription for user device 150 with details that correspond to an existing subscription for a second user device. In some implementations, the new subscription and the existing subscription may both be associated with user device 150, but may be for different consumables, such as one subscription for ink and another for media.

Billing engine 325 may calculate a pro-rated charge for a shortened first subscription period associated with the new subscription and combine a non pro-rated charge for a next non-shortened subscription period associated with the existing subscription with the pro-rated charge for the shortened first subscription period associated with the new subscription. For example, billing engine 325 may execute initiate new subscription instructions 130 to, in response to determining that the entity is associated with the existing subscription, initiate the new subscription with a subscription period coinciding with the existing subscription. For example, a subscription entry may be created in a fulfillment database that tracks which consumable(s), amounts of consumable(s), billing information, billing dates, and subscription periods, among other data. The subscription period may be entered so that it corresponds to an existing subscription entry and as such may share a billing date and/or billing period with the existing subscription.

In some implementations, the subscription period for the new subscription may comprise a shortened first subscription period. For example, a new subscription request may comprise a request for a monthly billing period that is received halfway through a monthly billing period for the existing subscription. The first billing period may thus be shortened so that the end of that first billing period coincides with the end of the existing subscription's current billing period.

Instructions 130 may further comprise instructions to calculate a pro-rated charge for the shortened first subscription period. For example, instructions 130 may combine a non pro-rated charge for a next non-shortened subscription period associated with the existing subscription with the pro-rated charge for the shortened first subscription period associated with the new subscription.

As an example, the new subscription may be received on the June $20^{th}$ and may comprise a regular, non-shortened subscription period of one month. The existing subscription may also comprise a regular subscription period of one month and may be configured to be billed on the last day of the month. Instructions 130 may combine the new subscription and the existing subscription by implementing the new subscription with a shortened first subscription period of 10 days—the difference between the date the subscription begins and the end date of the existing subscription's billing period. The bill for the first month may then be pro-rated to ⅓ of a full month's subscription for the period of 10 out of the 30 days in the month of June. Both the new and existing subscriptions may then be billed on the last day of the month by combining the pro-rated amount of the new subscription and the regular amount of the existing subscription.

Shipment engine 330 may cause a first subscription object associated with the new subscription to be delivered with a second subscription object associated with the existing subscription. For example, in some implementations, shipment engine 330 may cause delivery of a first subscription object associated with the new subscription with a second subscription object associated with the existing subscription. For example, the first subscription object may comprise a supply material (e.g., a black ink cartridge) for a first printing device and the second subscription object may comprise the same supply material (e.g., a second black ink cartridge) for a second printing device. For another example, the first subscription object may comprise a first supply material (e.g., a black ink cartridge) for a printing device and the second subscription object may comprise a second supply material (e.g., a pack of media) for the printing device.

In the foregoing detailed description of the disclosure, reference is made to the accompanying drawings that form a part hereof, and in which is shown by way of illustration how examples of the disclosure may be practiced. These examples are described in sufficient detail to allow those of ordinary skill in the art to practice the examples of this disclosure, and it is to be understood that other examples may be utilized and that process, electrical, and/or structural changes may be made without departing from the scope of the present disclosure.

What is claimed:

1. A non-transitory machine-readable medium storing instructions executable by a processor to:
   receive a request to initiate a new subscription for an entity;
   determine whether the entity is associated with an existing subscription; and
   in response to determining that the entity is associated with the existing subscription, initiate the new subscription with a subscription period coinciding with the existing subscription.

2. The non-transitory machine-readable medium of claim 1, wherein the subscription period for the new subscription comprises a shortened first subscription period.

3. The non-transitory machine-readable medium of claim 2, wherein the instructions to initiate the new subscription comprise instructions to calculate a pro-rated charge for the shortened first subscription period.

4. The non-transitory machine-readable medium of claim 3, wherein the instructions to calculate the pro-rated charge for the shortened first subscription period comprise instructions to combine a non pro-rated charge for a next non-shortened subscription period associated with the existing subscription with the pro-rated charge for the shortened first subscription period associated with the new subscription.

5. The non-transitory machine-readable medium of claim 2, wherein the instructions to initiate the new subscription comprise instructions to deliver a first subscription object associated with the new subscription with a second subscription object associated with the existing subscription.

6. The non-transitory machine-readable medium of claim 5, wherein the first subscription object comprises a supply material for a first printing device and the second subscription object comprises the supply material for a second printing device.

7. The non-transitory machine-readable medium of claim 5, wherein the first subscription object comprises a first supply material for a printing device and the second subscription object comprises a second supply material for the printing device.

8. The non-transitory machine-readable medium of claim 1, wherein the new subscription is associated with a first user associated with the entity and the existing subscription is associated with a second user associated with the entity.

9. The non-transitory machine-readable medium of claim 8, wherein the new subscription is associated with a first device associated with the entity and the existing subscription is associated with a second device associated with the entity.

10. A method comprising:
    receiving, by a processor, a request to initiate a new subscription for an entity;
    determining, by the processor, whether the entity is associated with an existing subscription; and
    in response to determining that the entity is associated with the existing subscription:
      determining, by the processor, whether the request to initiate the new subscription comprises a synchronization request, and
      in response to determining that the request to initiate the new subscription comprises the synchronization request, initiating, by the processor, the new subscription with a subscription period coinciding with the existing subscription.

11. The method of claim 10, wherein determining whether the entity is associated with the existing subscription comprises determining whether a billing method associated with the new subscription matches an existing billing method associated with the existing subscription.

12. The method of claim 11, wherein initiating the new subscription with the subscription period coinciding with the existing subscription comprises delivering a first subscription object associated with the new subscription with a second subscription object associated with the existing subscription.

13. The method of claim 10, wherein initiating the new subscription with the subscription period coinciding with the existing subscription comprises calculating a pro-rated charge for a shortened first subscription period associated with the new subscription.

14. A system comprising:
    a subscription engine comprising a first processor and a first memory storing instructions executable by the first processor to:
      receive a request to initiate a new subscription for an entity,
      determine whether the entity is associated with an existing subscription, and
      in response to determining that the entity is associated with the existing subscription, initiate the new subscription with a subscription period coinciding with the existing subscription;
    a billing engine comprising a second processor and a second memory storing instructions executable by the second processor to:
      calculate a pro-rated charge for a shortened first subscription period associated with the new subscription, and
      combine a non pro-rated charge for a next non-shortened subscription period associated with the existing subscription with the pro-rated charge for the shortened first subscription period associated with the new subscription; and
    a shipment engine comprising a third processor and a third memory storing instructions executable by the third processor to:
      cause a first subscription object associated with the new subscription to be delivered with a second subscription object associated with the existing subscription.

15. The system of claim 14, wherein the entity comprises at least one of the following: a business, an organization, a location, a user, and a device.

* * * * *